Nov. 17, 1959  R. B. HARTLE  2,913,074
LINER MATERIAL FOR STRUCTURAL ELEMENTS
Filed March 26, 1956  2 Sheets-Sheet 1

INVENTOR.
ROBERT B. HARTLE
BY
ATTORNEYS

Nov. 17, 1959  R. B. HARTLE  2,913,074
LINER MATERIAL FOR STRUCTURAL ELEMENTS
Filed March 26, 1956  2 Sheets-Sheet 2
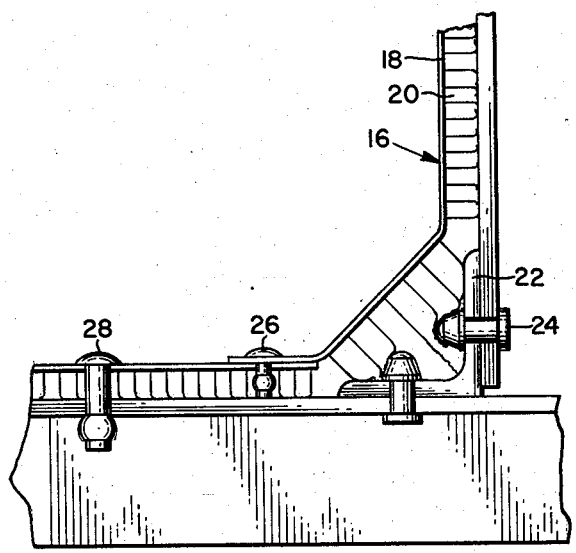
Fig. 2
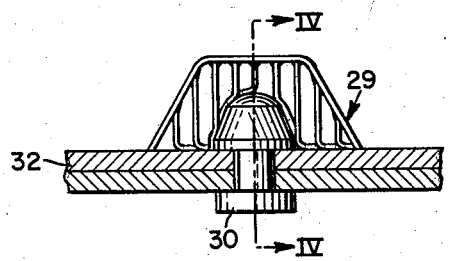
Fig. 3
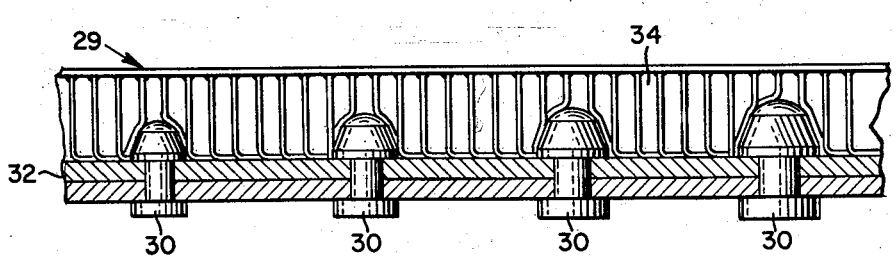
Fig. 4
INVENTOR.
ROBERT B. HARTLE
BY
ATTORNEYS United States Patent Office 2,913,074
Patented Nov. 17, 1959

2,913,074

LINER MATERIAL FOR STRUCTURAL ELEMENTS

Robert B. Hartle, Columbus, Ohio, assignor, by mesne assignments, to the United States of America as represented by the Secretary of the Navy Application March 26, 1956, Serial No. 574,049

1 Claim. (Cl. 189—34)

This invention relates to a panel construction and more particularly to a liner for an aircraft fuel cell formed of a single sheet of material having a layer of crushable cellular material secured to one side thereof.

The advantages of flexible fuel containers for aircraft, particularly military aircraft, have been well established. As shown in U. S. Patent No. 2,102,590, these flexible containers or tanks are usually installed in the wing structure of an aircraft where many protrusions are present, such as bolt heads, rivets, angles and the like, which eventually cause destruction of flexible containers by puncturing or through abrasion. As a result it has been found necessary to provide a back-up material to cover the various protrusions and present smooth surfaces to the container.

One practice employs balsa wood as a back-up material being light weight, readily formed and machined to receive large protrusions, and capable of being pressed into small protrusions. However, the use of balsa wood as a back-up material has several disadvantages in that a special surface treatment is required to avoid the absorption of fuel; the forming operations are time-consuming; and balsa wood has a small compression strength.

It has been found that the liner of the present invention overcomes the aforementioned disadvantages while simplifying installation, and supplementing the strength of the structure. According to the invention the liner is constructed of a single sheet of backing material having integrally attached to one side thereof a crushable cellular layer, preferably an aluminum honeycomb, for providing a smooth lining when attached to a structure having protrusions such as rivets, angles, etc. The honeycomb side of the liner is pressed against the structure to be lined and in the process the honeycomb is crushed by the protrusions being embedded therein. Accordingly, the honeycomb layer conforms to an uneven contour of the structure while the backing sheet retains its smooth outer surface, particularly suitable to house a flexible fuel container. The free ends of the honeycomb strips opposite the protrusion are crushed by the protrusions only to the extent necessary, ensuring a high degree of strength in compression, while maintaining a light weight construction. Suitable means are provided to secure the liner to the support as a permanent or detachable structure.

A principal object of the invention is to provide a liner which can be readily installed against a support having protrusions to present a smooth outer surface.

Another object is to provide a fuel cell liner for a flexible container capable of being readily crushed into position against a support having various protrusions to present a smooth surface to the container.

Other objects are to provide a fuel tank liner which will be more uniform and light weight in structure, possess a high compression strength, and reduces cost of installation.

Other objects and many of the attendant advantages of this invention will be readily appreciated as the same becomes better understood by reference to the following detailed description when considered in connection with the accompanying drawings wherein:

Fig. 2 is an enlarged section taken along line II—II of Fig. 1;

Fig. 3 is a cross section of a modified liner strip; and

Fig. 4 is a longitudinal section taken along line IV—IV of Fig. 3.

Figure 1:
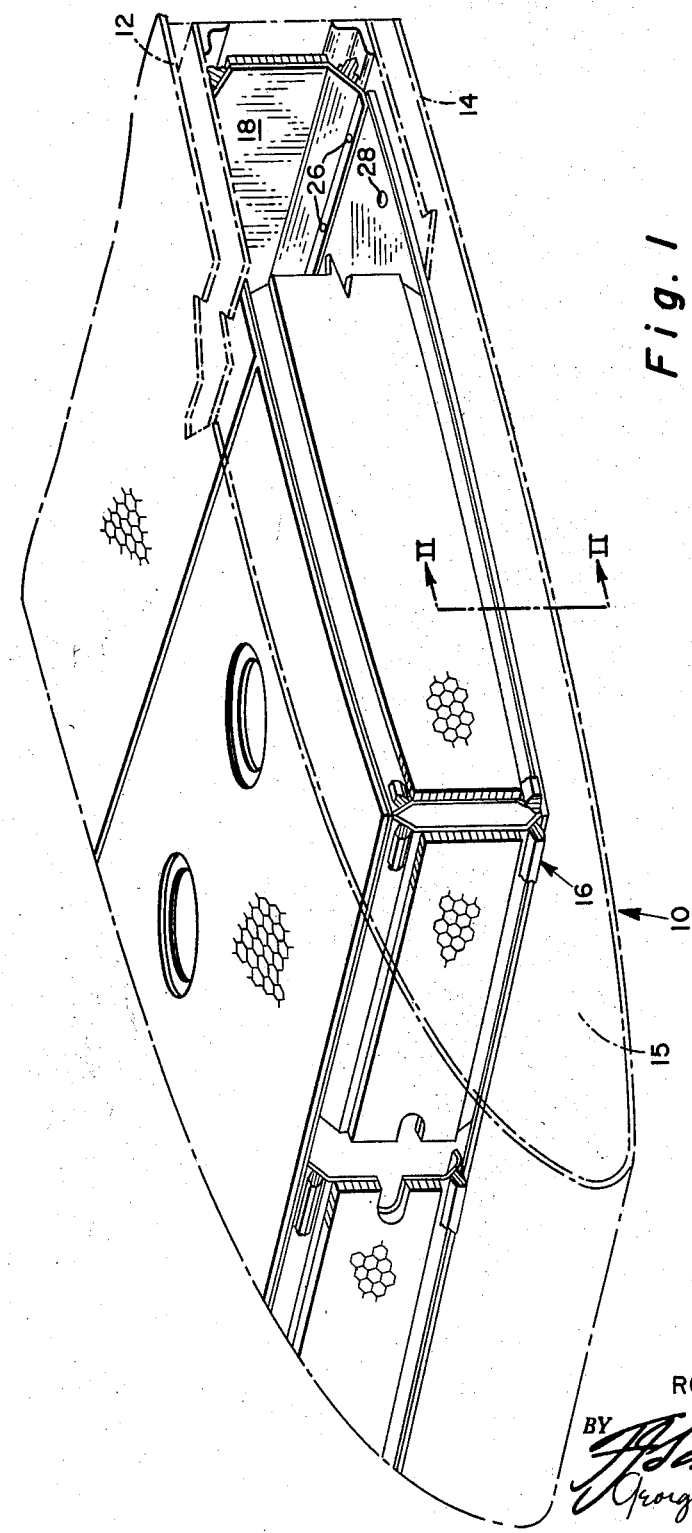
Fig. 1 is a fragmentary perspective view of a center section of a wing structure of an aircraft showing installed the fuel cell liner of this invention.

Referring now to the drawing wherein like reference characters designate like or corresponding parts throughout the several views there is shown in Fig. 1 a cross-section of a conventional airplane wing structure 10, shown by phantom lines, having upper and lower skin assemblies 12 and 14, respectively, forming a space 15 therebetween to house a fuel cell or tank, not shown, which may be a flexible type shown in U.S. Patent No. 2,102,590. As is illustrated in this patent, the flexible fuel tank is normally supported by the structural elements of the wing, and as is well known, a wing structure contains numerous elements such as bolt heads, high shear rivets and other protrusions which project inwardly of the fuel cell space, and should be covered by a liner to prevent damage to the fuel cell.

This invention is directed to a panel construction which in the instant application is illustrated as a liner assembly 16 for supporting the flexible fuel cell in an aircraft. The liner or panel assembly shown in greater detail in Fig. 2, comprises a single, thin sheet of backing material 18, preferably having an uninterrupted surface on one side thereof and having integrally attached to the other side a cellular crushable material 20, such as a honeycomb. One type of panel found to work satisfactorily is an aluminum honeycomb having an .008 inch thickness aluminum sheet. The honeycomb layer is formed of aluminum strips on the order of the thickness of foil, each strip having one edge bonded to the sheet and a free edge extending normal thereto. The thickness of the honeycomb layer can vary depending on the height of the protrusion to be embedded, and the size or shape of the panel will depend on the area to be lined. This panel can be easily sawed to the desired pattern, fitted and faired around structural parts.

The liner is applied by pressing the honeycomb side against the structure having the projections to be covered, such as an angle iron 22 and high shear rivets 24 shown in Fig. 2. The free ends of the honeycomb strips are crushed only to the extent necessary to accommodate the projections enabling the panel to retain its compression strength. Very little pressure is required to effect the installation, and the uninterrupted side of backing sheet 18 remains a smooth surface suitable for supporting flexible fuel containers.

As shown in Figs. 1 and 2, liner assembly 16 is formed of a plurality of panels secured together at their overlapping edges by rivets 26. It is noted that the overlapping panels are faired free of sharp corners or bends. The liner panels are secured to the wing supports by rivets 28 or any other conventional fasteners to provide a permanent or detachable installation.

As shown in Figs. 3 and 4 the panel may be formed into strip shape 29 sufficient to cover a line of shear rivets 30 of various sizes secured in a structure 32. As in the prior modification, the ends of the honeycomb are crushed during installation by the shear rivets only to the extent needed to conform. In the installation procedure the honeycomb strips in space 34 between the various projections may also be crushed to a slight degree against the support 32 which is in no way detrimental, and, in fact, may be desirable to insure a firm setting.

The panel of this invention provides a lining material which can be quickly installed against any support having one or more protrusions to be covered, and as illustrated, the panel is particularly suitable for use as the liner of an aircraft fuel cell of an aircraft since it is also lightweight, possesses a high compression strength, and does not require any special treatment to prevent absorption of fuel leakage.

Obviously many modifications and variations of the present invention are possible in the light of the above teachings. It is therefore to be understood that within the scope of the appended claim the invention may be practiced otherwise than as specifically described.

I claim:

The combination of an aircraft fuel cell bay having protrusions and a metal liner covering the entire inner surface of the bay and providing a rigid support for a flexible fuel cell, said liner comprising a single sheet having a smooth outer surface adapted to support the fuel cell and an inner surface, an open-ended metal foil honeycomb layer having two faces, one open-ended face of the layer being bonded to the inner surface of said sheet, portions of the other open-ended face of said layer opposing said protrusions being crushed around said protrusions during the application of the liner to the cell bay whereby the liner is in blanketing contact therewith, and means securing the liner in said blanketing position to the fuel cell bay.

References Cited in the file of this patent

UNITED STATES PATENTS

| | | |
|---|---|---|
| 1,870,595 | Thaden | Aug. 9, 1932 |
| 2,180,373 | Sibley et al. | Nov. 21, 1939 |
| 2,277,272 | Scott-Paine | Mar. 24, 1942 |
| 2,479,342 | Gibbons et al. | Aug. 16, 1949 |
| 2,537,026 | Brugger | Jan. 9, 1951 |
| 2,676,773 | Sanz et al. | Apr. 27, 1954 |
| 2,720,948 | Pajak | Oct. 18, 1955 |
| 2,728,479 | Wheeler | Dec. 27, 1955 |

FOREIGN PATENTS

| | | |
|---|---|---|
| 528,823 | France | Aug. 25, 1921 |